(12) United States Patent
Klemm et al.

(10) Patent No.: US 9,454,760 B2
(45) Date of Patent: Sep. 27, 2016

(54) NATURAL LANGUAGE PROCESSING (NLP) AND NATURAL LANGUAGE GENERATION (NLG) BASED ON USER CONTEXT FOR ENHANCED CONTACT CENTER COMMUNICATION

(71) Applicant: Avaya, Inc., Basking Ridge, NJ (US)

(72) Inventors: Reinhard Klemm, Basking Ridge, NJ (US); George Erhart, Loveland, CO (US); Lee Becker, Boulder, CO (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 118 days.

(21) Appl. No.: 14/103,144

(22) Filed: Dec. 11, 2013

(65) Prior Publication Data

US 2015/0163358 A1    Jun. 11, 2015

(51) Int. Cl.
*H04M 1/64* (2006.01)
*G06Q 30/00* (2012.01)
*G06F 17/28* (2006.01)

(52) U.S. Cl.
CPC ........... *G06Q 30/01* (2013.01); *G06F 17/2881* (2013.01)

(58) Field of Classification Search
CPC .......... G06F 17/30902; G06Q 10/063; H04L 67/10
USPC ..................... 379/88.01–88.19; 709/217–219
See application file for complete search history.

(56) References Cited

U.S. PATENT DOCUMENTS

| | | | |
|---|---|---|---|
| 8,370,155 B2 | 2/2013 | Byrd et al. | |
| 8,634,543 B2 | 1/2014 | Flockhart et al. | |
| 8,964,958 B2 | 2/2015 | Steiner | |
| 2008/0005076 A1* | 1/2008 | Payne | G06F 17/30967 |
| 2009/0164321 A1* | 6/2009 | Vasilakos | G06Q 30/02 705/14.52 |
| 2010/0235218 A1 | 9/2010 | Erhart et al. | |
| 2011/0125793 A1 | 5/2011 | Erhart et al. | |
| 2011/0125826 A1 | 5/2011 | Erhart et al. | |
| 2011/0161152 A1* | 6/2011 | Kash | G06Q 30/02 705/14.25 |
| 2013/0041653 A1 | 2/2013 | Tseng | |
| 2014/0108006 A1* | 4/2014 | Vogel | G06F 17/28 704/9 |
| 2014/0330551 A1* | 11/2014 | Bao | G06F 17/2836 704/3 |
| 2015/0004591 A1* | 1/2015 | Lidey | H04L 51/00 434/351 |
| 2015/0113435 A1* | 4/2015 | Phillips | G06F 3/0482 715/752 |
| 2015/0134645 A1* | 5/2015 | Adari | G06F 17/30867 707/722 |

OTHER PUBLICATIONS

"Nanorep Contextual Answers™, " nanorep, 2014, retrieved from http://www.nanorep.com/product/contextual-answers, 2 pages.

* cited by examiner

*Primary Examiner* — Solomon Bezuayehu
(74) *Attorney, Agent, or Firm* — Sheridan Ross P.C.

(57) ABSTRACT

Contact centers may incorporate automated agents to respond to inquiries. The inquiries may solicit a substantive response, for example, by providing a time when the inquiry asks for the departure time for a flight. Such responses omit the normal conversational subject matter used to embellish person-to-person conversations and appear are very machine-like. Herein, a source of user context, such as a social media website, customer database, or other data, is accessed. Certain aspects of the customer may then be identified and used to embellish the reply with additional and/or alternative content. As a result, the reply may be more conversational.

20 Claims, 3 Drawing Sheets

NATURAL LANGUAGE PROCESSING (NLP) AND NATURAL LANGUAGE GENERATION (NLG) BASED ON USER CONTEXT FOR ENHANCED CONTACT CENTER COMMUNICATION

FIELD OF THE DISCLOSURE

The present disclosure is generally directed toward responding to messages received in a contact center.

BACKGROUND

Contact centers respond to customer inquiries by various means. Automated systems generally provide a more cost-effective means to reply to a customer's inquiry, as compared to the customer speaking to a live agent. And, for many customers, the use of an automated system may be preferred over a live agent. Automated system, such as Interactive Voice Response ("IVR") systems, product inquiries, and automatic question and answer systems are provided for chat and/or text messaging may leave many customers frustrated. Complaints often include that the system is too impersonal, can't find the right option, can't get to an agent, takes too long to get an answer, answer is incorrect, etc.

SUMMARY

It is with respect to the above issues and other problems that the embodiments presented herein were contemplated.

Automated systems, sometimes known as a robot or "bot", or other software program is often used to answer customer queries, respond to user posts, etc. The prior art systems respond to queries with answers that are impersonal and cold and/or fact-based. The programs are not conversive with details, fluff, or banter as would often be found in a conversation between two people.

User context can be gathered from online posts, social media user profiles, real estate websites, online white pages, search engines, customer accounts, and other interactions. User context can range from highly static to highly dynamic. User context can be used to influence how an automated system responds to queries or posts and uses the contextual information to shape conversational and communication parameters. Natural language processing ("NLP") and natural language generation ("NLG") can give depth to this type of interaction, both in contact centers and in other forms of unified communications. Prior art systems can give answers to queries and posts, however, they are void of user context and the state of the user in public and private forums to influence the interaction. Such information can be collected and used in an automated system to improve the customer experience.

For example, a contact center might create responses influenced by the current state of the user on social or other public forums or even in a private context (i.e., Alpha Airlines knows I am in France). The context could also be enhanced by information other than social media context, including any purchases and interactions with agents. In the unified communications space, if there are automated responses available such as vacation messages, out of office messages, and so on that could also influence the response by being incorporated into the aggregated context.

Knowledge of a person's characteristics such as age, gender, profession, location, education, hobbies, interests, as well as knowledge of recent behavior (e.g., statements the sender made about a business, known purchases, etc.) can improve the accuracy of NLP algorithms. As mentioned above, the context can be static and dynamic. Static context can include user name, gender, age, etc. Dynamic context may include what a user thinks about a business, products he or she buys, how often the user travels, preferred vendors, etc.; a wide range of context parameters could therefore be utilized.

For example, knowing that a customer is 45 years old, a computer engineer, with an erudite and proper conversation style, may allow an NLP algorithm to interpret an online post "This server is cool" from this person as a description of the temperature of the computer while in operation. In contrast, when a fashion-conscious 16 year old posts the same words, it is more likely to be a statement of admiration for the style of the computer. Similarly, a chat robot that converses with a customer may tailor the style of the language generated by the system based on customer characteristics gleaned from the user context.

Analysis can include matching skills (e.g., what language, age of user, how technical, how educated) and content discovery from posts, tweets, posts from friends, etc. The context pieces would be used to answer the question, as may be done in the prior art, but the system would additionally shape the answer and be used to provide additional banter. This expansion of answers would provide a richer, more personalized response to users.

One aspect of the disclosure herein is the additional dialog/interaction responses that are possible with the NLG. A raw correct answer may include the addition of extra banter, surround, and conversational pieces based on the results of the NLP analysis and creates a natural dialog interaction. This is the difference between returning a correct "4:00 PM" as a response to "What time does Flight 205 leave?" and "Flight 205 leaves SFO at 16:00. The weather looks good when you land in Tokyo. It is currently 21 degrees. Make sure to check out Mt Fuji, there are some great hikes around the area." Such an embellished response is only meaningful and possible when the system knows about the user, including that he is European and an avid outdoors person who often travels internationally (because he is European, "military time" and degrees centigrade are used). That response is also appropriate for Facebook or text. For Twitter, there might be the shorter enhanced version "FLT 205 departs SFO @ 16:00. Don't miss hiking at Mt Fuji. Amazing!"

Example 1

Sally puts in a query to an airline as to her flight status. Rather than returning a canned response, "Your flight is delayed," the system could return a response, "I am really sorry that your flight is delayed. I know it happened the last time you flew with us, and it really stinks when traveling internationally. Please check your email for a $100 voucher for your next trip to France with our sincerest apologies."

Example 2

Jerry puts in a query to an airline as to his flight status. Rather than returning the canned response, "Your flight is delayed," the system could return a response, "We are so sorry that you have to wait an extra hour. The plane is coming from Denver, and they are having some nasty thunderstorms. In the meantime, there is a sale at the duty free store on watches. We've emailed a coupon in your name to the shop. There are a few really nice watches that have a cool new style and are waterproof. One of these would be great for your dive excursion!"

Generally, certain embodiments of message embellishment may include:

1. The gathering of background information on the customer. This information may come from many different sources. The system extends beyond the simple interactions with the company or the data the company has about the customer. The data sources can include: customer's social media history and profile (posts, comments, actions, likes, locations, temporal properties); customer's friends' social media history and profiles, customer's and friends' interactions with companies beyond the one giving the service, customer's internal company history/context.

2. The analysis of the information gathered is historical as well as continuous during the interactions: the analysis here has different goals of previous inventions. The goal is to enhance the typical; fact based answer and provide conversational aspects that would be appropriate. Matching the facts with the historical interests, locations, interactions that fit is the goal of this component. If the facts point to travel, then the system can find the appropriate travel related topics in the interactions, including locations, friends, and other companies and/or services that would then be used to add the conversational surround to the facts.

3. The response generation component performs the final tasks: automated responses where possible to fit the questions asked; agent suggested responses in an assist mode, suggestions could be full and complete or templates could be provided to the agent; and agent augmented responses where the agent's manual interactions are modified and/or changes are suggested to add the surround to make the interaction more desirable, banterish, and conversational.

In one embodiment, a method is disclosed, comprising: accessing a message by a contact center from a sender; formulating a substantive portion of a response to the message; accessing a user context of the sender; selecting an embellishment in accord with the user context; embellishing the response with banter from the embellishment; and sending the response to the sender.

In another embodiment, a system is disclosed, comprising: a communications interface; a database; a processor; and wherein the processor is operable to access a message by a contact center from a sender, formulate a substantive portion of a response to the message, access a user context of the sender, select an embellishment in accord with the user context, embellish the response with banter from the embellishment, and send the response to the sender.

In yet another embodiment, a non-transitory computer readable medium is disclosed with instructions thereon that, when read by a computer, cause the computer to perform: accessing a message by a contact center from a sender; formulating a substantive portion of a response to the message; accessing a user context of the sender; selecting an embellishment in accord with the user context; embellishing the response with banter from the embellishment; and sending the response to the sender.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedent.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
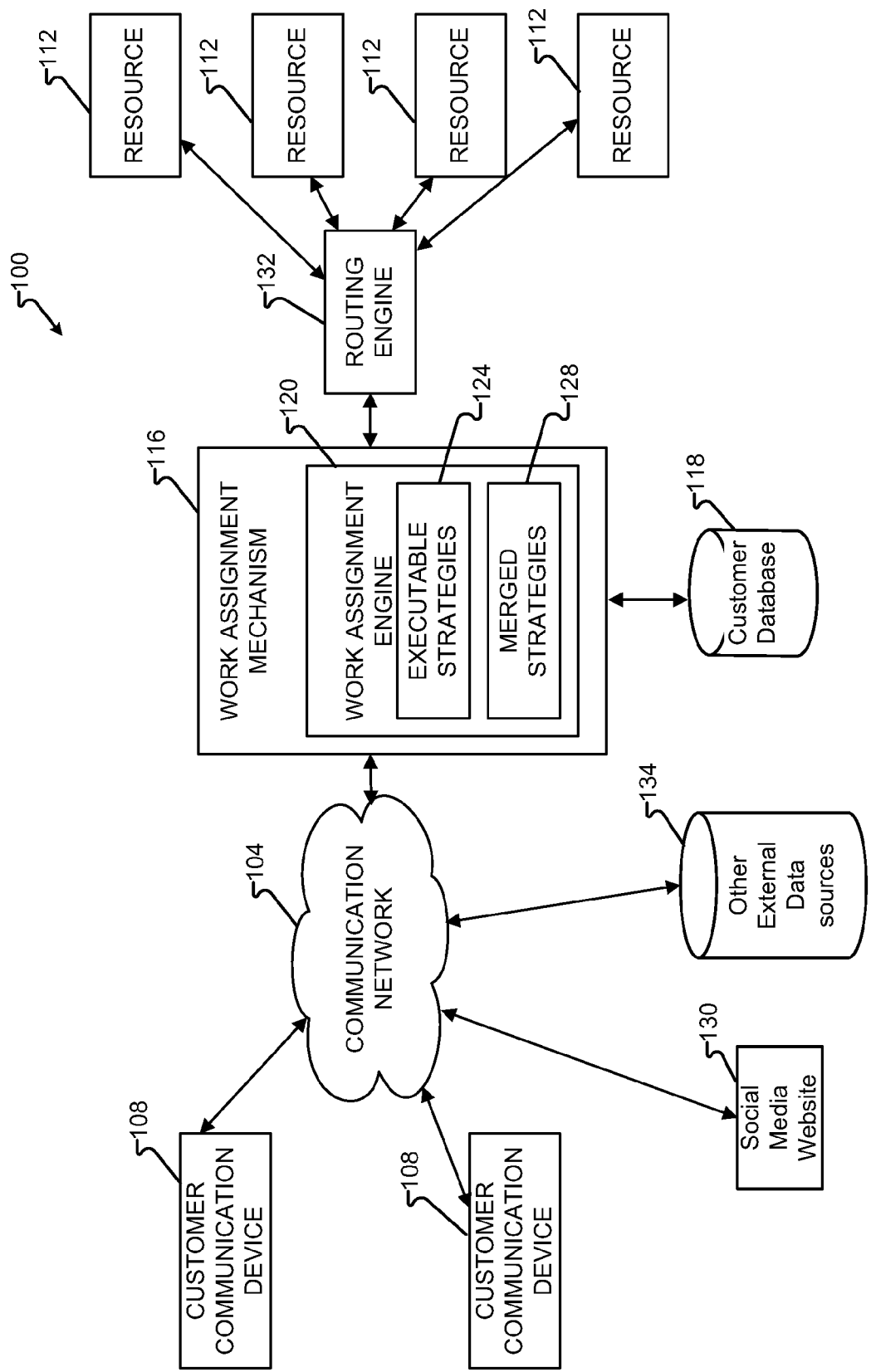
FIG. 1 depicts a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

More specifically, the work assignment engine 120 comprises executable strategies 124 that, when executed, enable the work assignment engine 120 to determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

In accordance with at least some embodiments of the present disclosure, the work assignment engine 120 may be configured to execute one or several executable strategies 124 to make work assignment decisions. As will be discussed in further detail herein, the work assignment engine 120 may comprise a plurality of executable strategies 124, where one or more of the executable strategies 124 include one or many tasks that are performed by the work assignment engine 120 during execution of the executable strategy 124. The order or manner in which the tasks of a strategy 124 are executed by the work assignment engine 120 may be defined by rules or policies, which may also be included in the executable strategy 120. Non-limiting examples of tasks that can be included in an executable strategy 124 include, without limitation, any of the following actions:

For a Resource: Add, Remove, Change a State (e.g., READY, ON DUTY, NOT READY, etc.), Update, Enable, Disable, Qualify Resource, Qualify Match, Score Resource, Begin, Finish, Set New Best, Enqueue, Dequeue, Accept, Reject, and Timeout For a Work Item: Add, Remove, Update, Cancel, Begin, Finish, Next Evaluation, Find Resource, Qualify Work, Qualify Match, Score Work, Set New Best, Enqueue, Dequeue, Accept, Reject, Requeue, Ready, Not-Ready, Complete, and Time-Out For a Service: Add, Remove, Update, and Enable For Determining a Best Match: Assign Work To Resource, and Determine Well-Matched For Determining Context: Heartbeat Failure, Customer Score, Custom Qualify, Custom Well Matched, Ready Res Service Capabilities, Not Ready Res Service Capabilities, Begin Resume, Begin Service Enable, Metric Sample, Intrinsic Sample, Intrinsic Sample All, Compute Requeue Metrics, Compute Enqueue Metrics, Compute Dequeue Metrics, Add Existing, Completed, Compute Rejected Metrics, Compute Accepted Metrics, Accepted, Rejected, Requeued, Compute Abandoned Metrics, and Compute Completed Metrics The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In one embodiment, a message is generated by customer communication device 108 and received, via communication network 104, at work assignment mechanism 116. The message received by a contact center, such as at the work assignment mechanism 116, is generally, and herein, referred to as a "contact." Routing engine 132 routes the contact to at least one of resources 112. Resource 112 analyzes the message and determines if an answer can be generated and, if so, accesses the necessary resources to generate a substantive portion of the reply. For example, a contact inquiring, "What time does my flight leave?" may cause resource 112 to access the customer records to determine who is asking, what flight reservations they may have, locate the next scheduled flight for the customer, and access the flight departure time for that particular flight. The substantive portion of the response being, "2:00 PM." However, such a response is cold, impersonal, and very machine-like, therefore embellishing the reply may provide the same substantive reply within a more friendly and personal message.

In another embodiment, resource 112, alone or via other components, such as work assignment mechanism 116 and/or communication network 104, accesses social media website 130 and/or other external data sources 134 to gather context information which may then be used to embellish a response received by work assignment mechanism. The context information gathered from customer database 118, social media website 130, and/or other external data sources 134, for the purposes of embellishing a substantive reply are referred to herein as, "user context." A user context may include nearly any aspect of a sender. Broadly, user context include, but are not limited to, past interactions (e.g., last order, last inquiry, delivery inquiry, etc.); demographic information (e.g., name, address, city, state, country, age, gender, etc.); interests (e.g., purchases fishing gear and tennis racquets, travels to Europe and Asia several times a year); income indicators (e.g., shops at expensive stores, buys first-class tickets, etc.); locate at a past, current or future dates and places (e.g., city information, shopping, events, weather, traffic, etc.); preferences (e.g., formal/informal, erudite/unscholarly, etc.); and/or other attributes.

One user context is the user's use of punctuations within social media website 130. In an effort to provide a response more like the user's responses, the embellishment may strive to emulate the punctuations habits of the user. For example, a user may have a proclivity to use a lot of exclamation marks, parenthetical, or omit certain punctuation marks. Accordingly, the embellishment may similarly apply such a punctuation style to the reply.

Another user context is a connection with, at least, social media website 130. The connections may be implied by the use of a particular social media websites 130 to provide a user context. In one embodiment, the particular social media website 130 provides information of the connections. For example, a user who posts a message on LinkedIn, is more likely to be business and/or professionally minded than a post on a site used for social networking (e.g., Facebook). Other site may be directed towards a particular activity or interest and, the user context similarly implied. Therefore, a user context may be derived from the site itself and embellished according to the site. In another embodiment, the user's connections provide a user context. For example, if a user interacts with connections with a certain style (e.g., formal/informal, injects certain "tells" of hobbies, interests, etc.), then the embellishment may similarly inject the style in the reply. In a further embodiment, such as when the user's profile is limited, the user's connections may reveal a user context. For example, a substantially empty or non-accessible profile and/or history of a user is all that is available, but the user has a large proportion of connections of a certain age, gender, profession, location, etc. Accordingly, the user context may be derived from the profiles/histories of such connections and the reply embellished to mimic an attribute of the connections.

In one embodiment, resource 112 accesses customer database 118 to retrieve context information used to embellish a reply. As described above, customer database 118 may include flight information for a customer, as an example of a current activity or past purchase. In another embodiment, resource 112 also accesses social media website 130 to retrieve additional context information used to embellish a reply. For example, a customer is identified in social media website 130 and determined to be European. Therefore, one embellishment would be the time formatting. In particular, Europeans generally use "military time" as opposed to a 12-hour clock with an AM-PM designation, as is common in the United States. In another example, a customer is identified has having a preference to formality and responses are therefore formatted to address the customer formally (e.g., "Mr. Smith," "Dr. Jones," etc.). Social media website 130 may be a source of interest, hobbies, likes; friends, relatives, and other connections; education, formality-informality language preferences; age, gender, and other demographics; and/or other information provided in the form of profile attributes, posts and comments, likes and other endorsements of others' posts and comments.

In yet another embodiment, resource 112 accesses a plurality of sources of user context, to retrieve information used to embellish a reply. For example, traffic, weather, and locale-specific information could be accessed for a traveler to help formulate a reply within the interests of the sender determined from another source. As a result, the replies may incorporate multiple user contexts, such as, "Good Morning, Ms. Smith. Your flight leaves at 14:00 but the rain in Paris this afternoon might make getting a taxi to the airport more difficult. Please allow additional time," "Hi Bill. If you can, Mt. Fuji is an incredible sight. Check it out," "There is a sale at the XYZ store 2 blocks north," and "Since you like barbeque, you should know the best barbeque place in town, according to Yelp, is very close to your hotel," etc.

Figure 2:
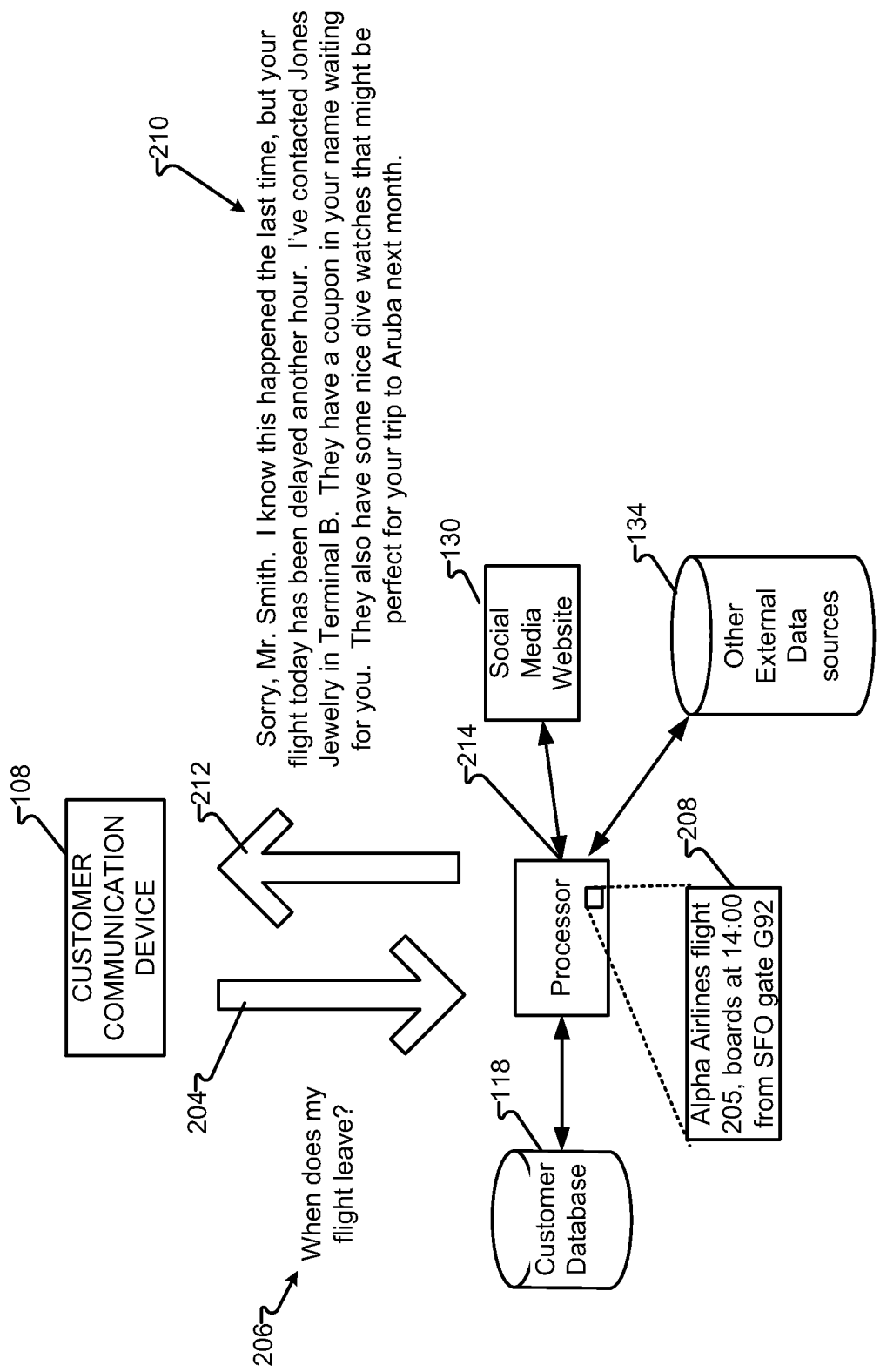
FIG. 2 depicts a block diagram of communication system in accordance with at least some embodiments of the present disclosure.

FIG. 2 shows a block diagram of communication system 100 in accordance with at least some embodiments of the present disclosure. Customer device 108 formats message 206 and contact 204, with message 206 as a component thereof, is received by processor 214. In one embodiment, processor 214 is a component of resource 112, however, it should be appreciated that other system configurations are also possible without departing from the disclosure provided herein. As an example, the processor 214 may be included as part of the work assignment mechanism 116.

In operation, the processor 214 receives the contact and formulates substantive reply 208. Processor 214 may also access one or more of customer database 118, social media website 130, and/or other external data sources 134 to embellish the reply. Reply 210 is formatted with embellishments and sent 212 to customer communication device 108

The selection of which user context to utilize as an embellishment may be determined as a matter of design choice such as to accommodate common follow-up questions, to promote a particular vendor or product, most closely associated with a sender, or other methodology. For example, it may become known that eighty-percent of the questions asking when a flight leaves are followed by a second questions asking what gate the flight departs from. Therefore, when replying to flight times, the gate information is also included. In another example, the sender of a message has a large presence in social media website 130 related to golf. Accordingly, an embellishment related to golf or golf-related aspects (e.g., weather, location of courses, pro shops, etc.) are selected over location/date-base embellishment (e.g., "Tonight's the opera has good seats still available."). In other examples, travel information, prior activities or other embellishment may be selected according to an embellishment policy, which may include sequentially or randomly selected content subject matter.

In another embodiment, a user context is selected in accord with the location of the sender, such as determined by social media website 130 and/or other external data sources 134, may be utilized to select an embellishment. For example, message 206 (e.g., "When does my flight leave?") may warrant different embellishments depending on time and senders location. For example, if the substantive response is, "in ten minutes," and the sender is located in a restaurant close to the departure gate, the embellishment may include, "Have a good flight" or "Time to go." However, in another example, the sender is determined to be many miles from the airport, the embellishment may include a link or other means to change flights, such as, "Your flight leaves in 10 minutes. If you need to make other arrangements, call 888.555.1212 or <click here> to check seat availability on later flights." In yet another example, the response indicates the flight is the next day, in which case the embellishment may be unrelated to the flight, for example, "Your flight leaves at 2:00 PM tomorrow. Since you're close to the theatre district, tonight may be a good night to catch a show. Good seats are still available."

Figure 3:
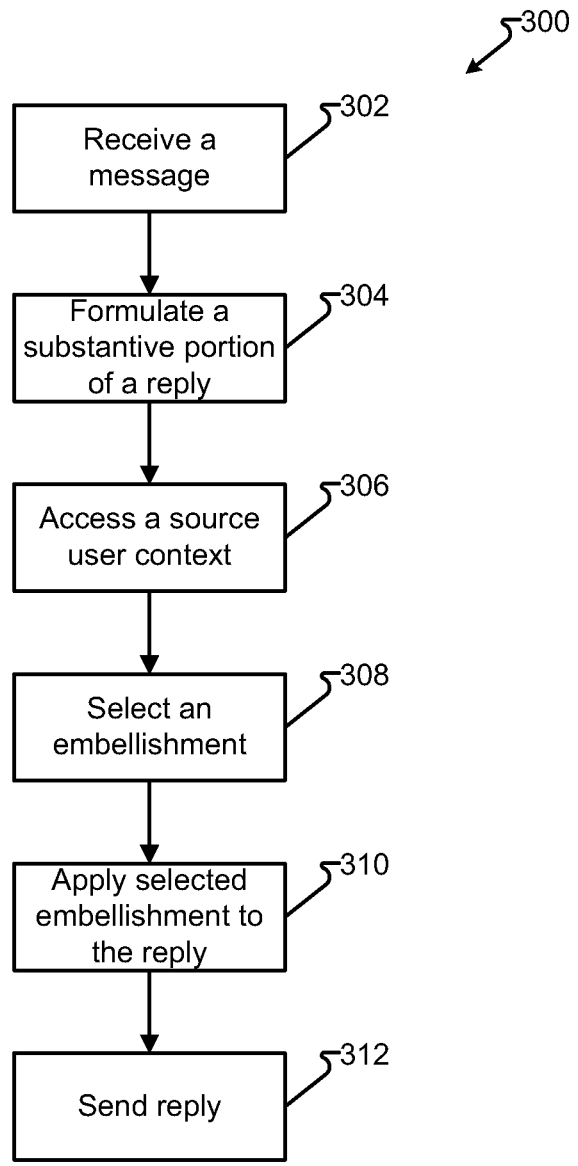
FIG. 3 depicts a process in accordance with at least some embodiments of the present disclosure.

FIG. 3 depicts process 300 in accordance with at least some embodiments of the present disclosure. In one embodiment, step 302 receives a message (e.g., the content portion of a contact). The message may be received by work assignment mechanism 116 and, via routing engine 132, delivered to one or more of resources 112. In step 304, a substantive portion of a response is formulated. In step 306, one or more sources of user context are accessed, such as social media website 130, customer database 118, and/or other external data sources 134.

At least one embellishment is selected in step 308 and applied to the substantive response in step 310. The reply, including a substantive portion and an embellishment, is sent in step 312. In another embodiment, resource 112 includes a live agent. Whereby the live agent may be prompted to deliver the reply. In yet another embodiment, a live agent prepares the substantive portion of the reply and resource 112 provides the embellishment.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   accessing a message, by a computer, of a contact center from a sender;
   formulating, by the computer, a portion of a response to the message;
   storing, by the computer, the portion of the response in a memory;
   accessing, by the computer, a user context of the sender;
   selecting, by the computer, an embellishment in accord with the user context;
   retrieving, by the computer, the stored portion of the response from the memory;
   updating, by the computer, the retrieved portion of the response to include banter associated with the embellishment thereby creating an updated response; and
   sending, via a communications network, the updated response to the sender.

2. The method of claim 1, wherein the user context comprises a descriptive element of one of a past transaction, a past interaction, a posting on a social media website, a social media profile element, an endorsement of a posting on a social media website, an event attended, a social media connection, or a demographic descriptor.

3. The method of claim 1, wherein the user context comprises a punctuation usage style associated at least one social media post of the sender.

4. The method of claim 1, wherein the user context comprises a social media website connection of the sender.

5. The method of claim 1, wherein the user context comprises one of age, gender, occupation, marital status, income, education, or area of residency.

6. The method of claim 1, wherein the user context comprises one of language formality preference, regional dialect, language fluency, or domain expertise.

7. The method of claim 1, wherein the embellishment comprises additional content to the portion of the response.

8. The method of claim 1, wherein the embellishment modifies the presentation of the portion of the response.

9. The method of claim 1, wherein the embellishment comprises a selected one of a number of potential embellishments in accord with the user context.

10. The method of claim 9, wherein the selected one of the number of potential embellishments is determined, at least in part, by one of providing supplemental information relevant to the message, providing supplemental information relevant to the sender, accommodating a preference of the sender, or building affinity with the sender.

11. A system, comprising:
    a communications interface;
    a computer memory;
    a processor coupled to the computer memory; and
    wherein the processor accesses a message of a contact center received from a sender, formulates a portion of a response to the message, store the portion of the response in the memory, accesses a user context of the sender, selects an embellishment in accord with the user context, retrieves the stored portion of the response, updates the retrieved portion of the response to include banter associated with embellishment thereby creating an updated response, and sends the updated response via the communications interface to the sender.

12. The system of claim 11, wherein the user context comprises a descriptive element of, one of a past transaction, a past interaction, a posting on a social media website, a social media profile element, an endorsement of a posting on a social media website, an event attended, a social media connection, or a demographic descriptor.

13. The system of claim 11, wherein the user context comprises, one of age, gender, occupation, marital status, income, education, or area of residency.

14. The system of claim 11, wherein the user context comprises, one of language formality preference, regional dialect, language fluency, or domain expertise.

15. The system of claim 11, wherein the embellishment comprises additional content to the portion of the response.

16. The system of claim 11, wherein the embellishment modifies the presentation of the portion of the response.

17. The system of claim 16, wherein the selected one of the number of potential embellishments is determined, at least in part, by one of providing supplemental information relevant to the message, providing supplemental information relevant to the sender, accommodating a preference of the sender, or building affinity with the sender.

18. A means for embellishing a response, comprising:
means for accessing a message by a contact center from a sender;
means for formulating a portion of a response to the message;
means for storing the portion of the response in a computer memory;
means for accessing a user context of the sender;
means for selecting an embellishment in accord with the user context;
means for retrieving the stored portion of the response from the memory;
means for updating the retrieved portion of the response, retrieved from the memory, with banter from the embellishment; and
means for sending the updated response to the sender.

19. The instructions of claim 18, wherein the embellishment comprises one of a number of potential embellishments selected in accord with the user context.

20. The instructions of claim 19, wherein the means for selecting one of the number of potential embellishments is determined, at least in part, by one of providing supplemental information relevant to the message, providing supplemental information relevant to the sender, accommodating a preference of the sender, or building affinity with the sender.

* * * * *